RECORDING MEDIUM DRIVE MECHANISM
Filed Oct. 12, 1967 4 Sheets-Sheet 1
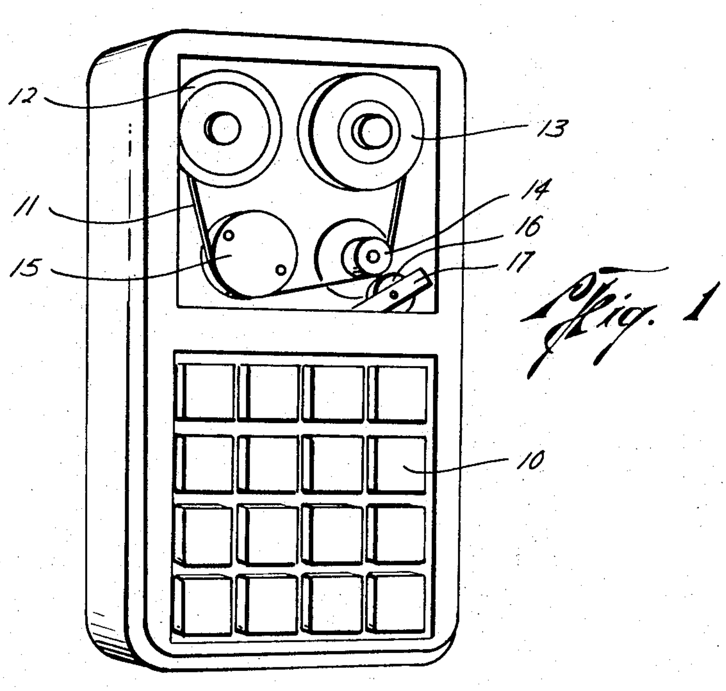
Fig. 3
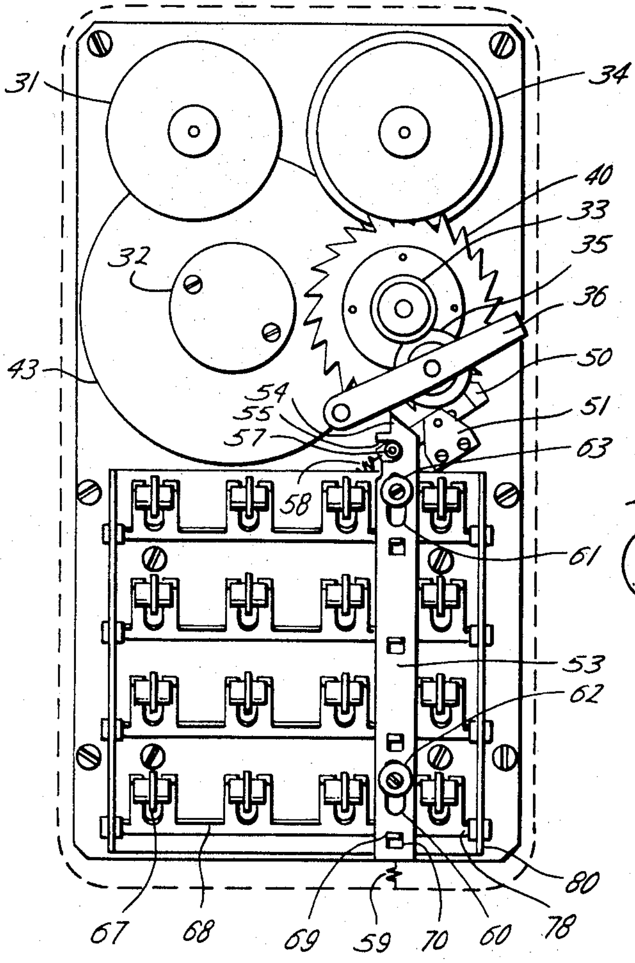
Fig. 2
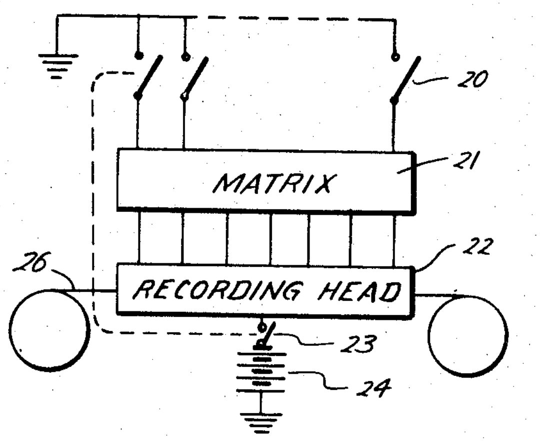
Francis A. Fuller, Jr.
INVENTOR
BY Arnold, Roylance, Kruger & Durkee
ATTORNEYS Francis A. Fuller, Jr.
INVENTOR BY Arnold, Roylance, Kruger & Durkee
ATTORNEYS Francis A. Fuller, Jr.
INVENTOR BY Arnold, Roylance, Kruger & Durkee
ATTORNEYS Francis A. Fuller, Jr.
INVENTOR BY Arnold, Roylance, Kruger & Durkee
ATTORNEYS

United States Patent Office 3,550,151

Patented Dec. 22, 1970

3,550,151

RECORDING MEDIUM DRIVE MECHANISM

Francis A. Fuller, Jr., Dallas, Tex., assignor to Universal Data Acquisition Co., Inc., Houston, Tex., a corporation of Texas

Filed Oct. 12, 1967, Ser. No. 674,852

Int. Cl. G01d *15/12;* B65h *17/22;* F16d *63/00*

U.S. Cl. 346—74 9 Claims

ABSTRACT OF THE DISCLOSURE

A drive mechanism especially suited for use in a portable data recorder which allows the recording medium to advance in discrete increments between record entries. A coupling mechanism including an indexing wheel is provided for coupling a source of power to the drive means for the recording medium. Normally, a pawl member engages the indexing wheel and prevents operation of the drive means. Another member disengages the pawl member when an encoding key is depressed. When disengaged, the pawl assumes a position for re-enaging the indexing wheel upon the release of the encoding key.

BACKGROUND OF THE INVENTION

This invention relates to recording devices, and in particular to a drive mechanism especially useful in a portable recorder, but not limited thereto.

This application is related to application Ser. No. 666,-746, filed Sept. 11, 1967 for Alpha-Numeric Encoder.

With the increasing complexity of modern business and industry, particularly in the volume of data which must be recorded, the need for data storage devices and computers for handling the data has increased at a rapid rate. Even with the availability of computers, the manpower required for gathering and handling data has become large and expensive. It has been the usual practice to record field information in a notebook, for example, and later transfer such information by means of a manually actuated punch or other device to punch cards by magnetic tape. Besides the time involved in this process, the possibility of making errors in the data increases when handling the data several times.

Thus, there has developed a special need for portable recording devices relatively small in size and simple to operate which are capable of recording data at the source location for direct input into computers.

The limited space and weight requirements of such a portable recorder presents a challenge in devising a versatile data encoder and a suitable drive means for the record medium.

To meet this need, a novel portable recording device has been developed. Copending application Ser. No. 666,746 filed Sept. 11, 1967 and assigned to the assignee of the present invention, discloses the method and means of encoding a relatively large number of different characters with an encoder having a limited number of keys. As disclosed in the application, digital code is provided for the keys of a keyboard so that the keys function in either single and dual modes of operation for encoding.

The present invention is a drive mechanism especially suited for a portable recorder such as described in the copending application. The escapement mechanism thereof allows the recording medium to advance a precise distance between record entries.

SUMMARY OF THE INVENTION

The drive mechanism in accordance with the present invention includes a source of mechanical power and a drive means for moving a magnetic tape or other suitable recording medium past a recording head. Means including an indexing wheel are provided for coupling the power source to the drive means. Normally, pawl means engages the indexing wheel and prevents operation of the drive means. Means are provided for disengaging the pawl means and allowing the drive means to advance the tape a predetermined distance between the encoding of data on the tape.

Preferably the power source is a spring motor comprising a special prestressed and thermally processed steel spring. Such a motor provides constant tension and a constant force drive. The pawl means in the escapement mechanism includes a first pawl member which normally engages the index wheel in the coupling means, and a second pawl member which engages the indexing wheel when an encoding key of the recorder is depressed. Engagement of the second pawl member disengages the first pawl member and positions the first pawl member for re-engagement with the indexing wheel upon disengagement of the second pawl member. The first pawl member is movably mounted so that said pawl member is positioned to engage a different portion of the indexing wheel thereby allowing the indexing wheel to advance a predetermined distance. This allows the drive means to move the magnetic tape or other recording medium a precise amount past the recording head of the recorder.

The invention will be more fully understood from the following detailed description and appended claims when taken with the drawings.

BRIEF DESCRIPTION OF THE DRAWINGS

FIG. 1 is a perspective view of a portable recorder in which the present invention has utility.

FIG. 2 is a functional block diagram of the recorder shown in FIG. 1.

FIG. 3 is a top view of the recorder in FIG. 1 with the top cover removed and illustrates one embodiment of the drive mechanism in accordance with the invention.

Figure 4:
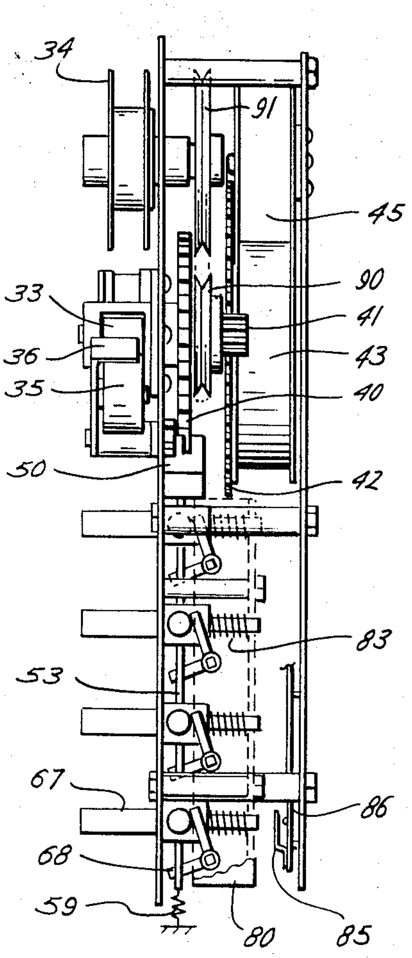
FIG. 4 is a side view of the recorder and further illustrates the drive mechanism.

FIGS. *9a–9f* illustrate the cooperative action of the pawl means and the indexing wheel of the recorder drive mechanism.

DESCRIPTION OF THE ILLUSTRATIVE EMBODIMENTS

Referring now to the drawings and in particular to FIG. 1, a portable magnetic recorder shown in perspective includes an encoding keyboard, an encoding matrix associated with the keyboard and defining a digital code, a magnetic recording medium, means for recording a digital code on the magnetic medium, and a drive mechanism for advancing the recording medium past the recording means. The keyboard including keys 10 and the associated code matrix is described in detail in the copending application Ser. No. 666,746, referred to above. The illustrated magnetic medium is a tape 11 which is taken from a supply reel 12 and taken up on pick up reel 13. Capstan 14 drives the tape past magnetic recording head 15 which magnetically records the encoded data on the tape. Pinch roller 16 maintains the tape in firm contact with the capstan roller. Spring biased pivot bracket 17 is provided to pivotally move the pinch roller away from the capstan wheel while loading or unloading tape on the recorder.

Operation of the portable recorder will now be briefly described with reference to the block diagram in FIG. 2. Key actuated switches 20 connect the matrix 21 to ground. When one or more of the switches are closed, electrical circuits in matrix 21 are connected to ground and define a digital code which is transmitted to the record head 22. Switch 23 is coupled with switches 20 so that when a key on the keyboard is depressed, a switch 20 and switch 23 are sequentially closed. The closing of switch 23 provides a current from battery 24 through the record head 22 which effects the recording of the digital code on magnetic tape 26. After each recording, a drive mechanism advances the tape past the recording head.

Figure 5:
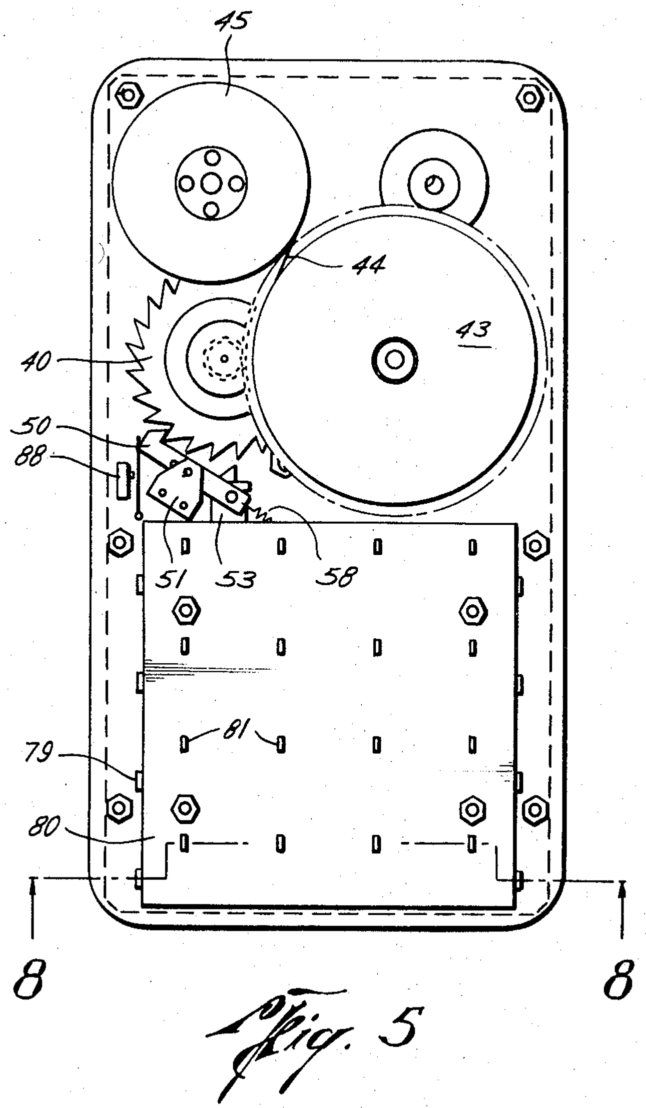
FIG. 5 is a bottom view of the recorder and still further illustrates the drive mechanism.

The drive mechanism for such a portable recorder in accordance with this invention is illustrated in the top, side and bottom views of a portable recorder shown in FIGS. 3, 4 and 5, respectively.

In FIG. 3, a top view of the recorder is shown with the keys and top cover removed so that the drive mechanism can be better visualized. Magnetic tape is taken from reel 31, passed over record head 32, passed over the drive capstan 33, and stored on pick up reel 34. Pinch roller 35 maintains the tape in firm contact with the capstan 33, and spring biased pivot bracket 36 is provided to pivotally move the pinch roller away from the capstan wheel. Mounted on the same shaft with the capstan wheel 33 is an indexing wheel or ratchet 40.

With reference to the side view in FIG. 4, gear 41 is mounted on the shaft with capstan wheel 33 and indexing wheel 40. Gear 41 mates with gear 42 on the shaft of spring motor 43. The spring motor comprises a special prestressed and thermal processed steel spring which provides a constant tension and constant force drive for the recorder. A suitable spring is the Neg'ator spring sold by the Hunter Spring Division of Ametek, Inc. As shown in the bottom view of the recorder in FIG. 5, the spring 44 uncoils from the spring motor 43 onto coil drum 45.

Operation of the spring motor is normally blocked by means of a pawl member 50 which engages the teeth of indexing wheel 40, as best illustrated in FIG. 5. Pawl member 50 is slidably and pivotally supported by stationary support 51. The pawl member is disengaged from the indexing wheel by means of key actuated bar 53. Bar 53 includes a pawl portion 54 for engaging the indexing wheel and slot portion 55 for accommodating the pin 57 on the pawl member 50, as shown in FIG. 3. Spring 58 biases pawl member 50 and spring 59 biases bar 53. Bar 53 has slots 60 and 61 which are engaged by stationary pins 62 and 63, respectively, thus allowing the bar freedom of linear movement.

Referring to FIG. 3, actuation of bar 53 is effected by depressing a key lug 67 which engages and pivots a rocker arm 68. A projection 69 of the rocker arm is positioned in slot 70 of the bar 53, and the pivotal motion of rocker arm 68 caused by depressing a key lug imparts the linear motion to bar 53.

Figure 6:
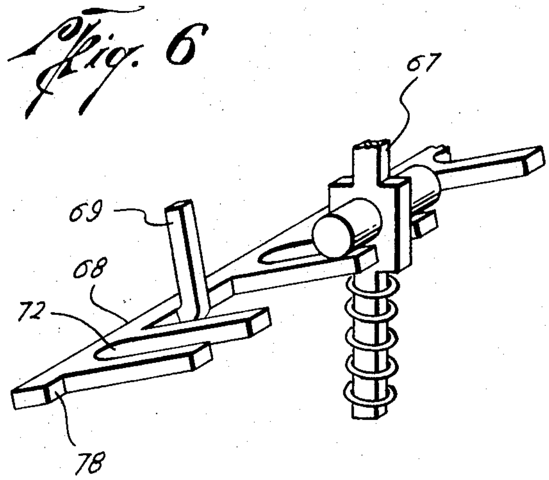
FIG. 6 is a perspective view of a portion of the key actuated rocker arm in the recorder.
Figure 7:
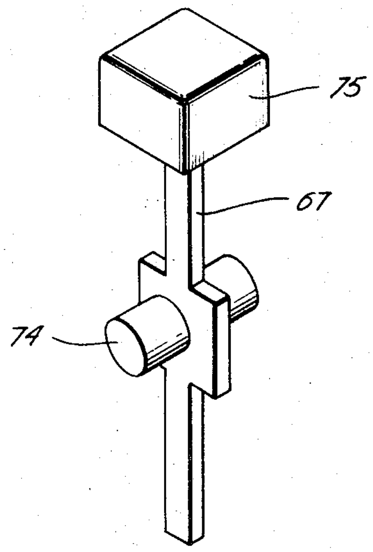
FIG. 7 is a perspective view of a key lug in the recorder.

FIG. 6 is a perspective view of a portion of rocker arm 68 and further illustrates the projection 69 which engages the slot 70 in bar 53. A key lug is positioned in slot 72 of the rocker arm. FIG. 7 is a perspective view of the key lug 67 which includes a rocker pin 74 which engages the rocker arm and a key 75.

Figure 8:
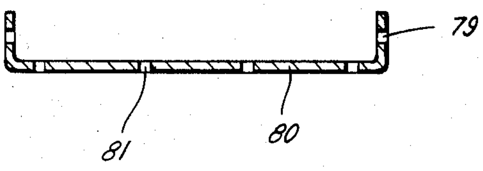
FIG. 8 is a cross-sectional view of support plate in the recorder.

Projections 78 of the rocker arm are rotatably mounted in a support member 80. FIG. 8 is a section view taken along the section lines 8—8 in FIG. 5 of the support member 80. The support member also includes slots 81 which cooperate with slots in the top cover of the recorder to provide supporting guides for the key lugs 67. Each key lug is biased by spring means 83 as shown in the side view in FIG. 4.

In operation, when a key lug 67 is depressed, contact switch 85 shown in FIG. 4, which corresponds to a switch 20 in FIG. 2, on the matrix board 86 is closed. Rocker arm 68 slide bar 53 so that pawl 54 of the bar 53 engages a tooth of the indexing wheel 40. Pawl member 50 is pivotally moved by the movement of the bar and closes record switch 88 shown in FIG. 5. Switch 88 corresponds to switch 23 in FIG. 2. As soon as pawl member 50 is disengaged from the indexing wheel, spring 58 slides pawl member 50 to a position for re-engaging the indexing wheel 40 when the key lug 67 is released. Upon release of the key lug, spring 59 moves bar 53 so that pawl portion 54 of bar 53 disengages the indexing wheel 40. The indexing wheel is then free to move until pawl member 50 re-engages the indexing wheel.

Thus, it is seen that the sequence of operation is the depression of key lug 67, closing of encoding switch 85, engagement of pawl portion 54 of bar 53, disengagement of pawl bar 50, closing of record switch 88, release of key lug 67, disengagement of pawl portion 54, indexing of the tape, and then re-engagement of pawl bar 50.

Tension is always maintained on the magnetic tape as it is wound on the pick-up reel 34. This is accomplished by means of a slip belt which couples pulley 90 on the capstan shaft and pulley 91 on the pick-up reel shaft as shown in FIG. 4. Because of the relative diameters of the pick-up reel 34, capstan 33, and pulleys 90 and 91, the pick-up reel attempts to pick up tape faster than the capstan drives the tape. Thus, tension is maintained in the tape between the capstan drive and the pickup reel. Tape supply reel 31 shaft is provided with a pulley similar to pulley 91 on the pick-up reel shaft. A spring drag slip belt is provided for this pulley thereby maintaining tension on the tape as it is taken from the supply reel.

Figure 9A:
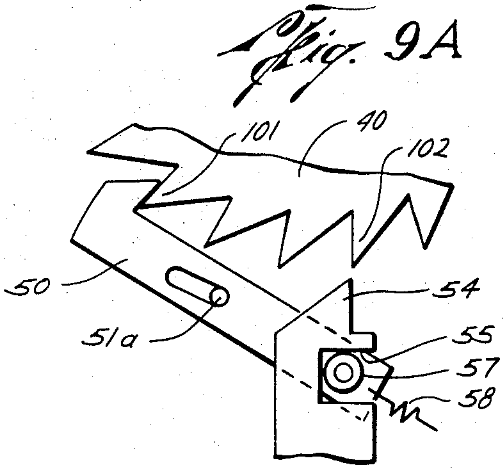
Figure 9B:
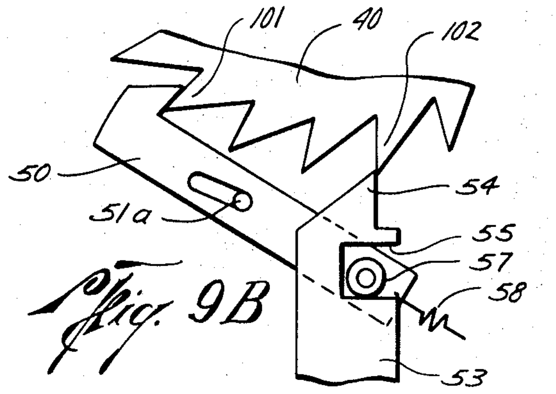

The sequential operation of the pawl means in the escapement mechanism further illustrated in FIGS. 9*a*–9*f*. In FIG. 9*a* the escapement mechanism is shown in the normal position with no key of the keyboard depressed. Indexing wheel 40 is prevented from rotatably moving by means of pawl bar 50 which is supported by the pin 51*a* of stationary support 51 shown in FIG. 5. Bar 53 is disengaged from the indexing wheel 40. Pin 57 of the pawl bar 50 is allowed to float in slot 55 or bar 53.

As a key is depressed, bar 53 moves linearly so that pawl portion 54 of the bar engages tooth 102 of the indexing wheel 40, and pin 57 of pawl 50 is contacted thereby pivoting pawl bar 50 about pin 51*a* and disengaging the pawl bar from tooth 101 of the indexing wheel. The pivotal motion of pawl 50 closes record switch 88 shown in FIG. 5.

Figure 9C:
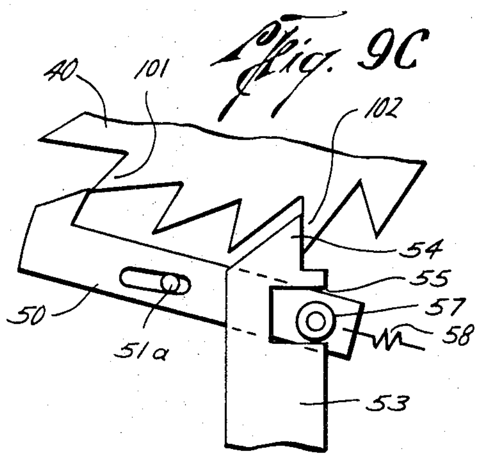

In FIG. 9*c*, pawl bar 50 is disengaged from tooth 101 and spring 58 pulls the pawl 50 downwardly with the slot in pawl bar 50 sliding past pivot pin 51*a*.

Figure 9D:
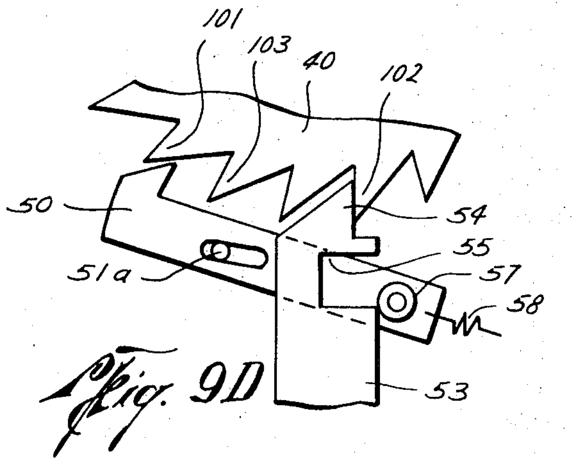

In FIG. 9*d*, a key of the keyboard is completely depressed and pawl 54 of bar 53 engages the indexing wheel thereby preventing movement of the wheel. Pawl bar 50 has been positioned to engage tooth 103 of the indexing wheel as soon as pawl section 54 of bar 53 is disengaged.

Figure 9E:
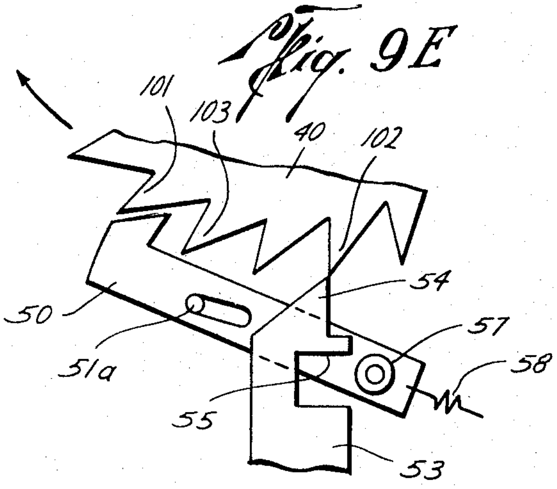
Figure 9F:
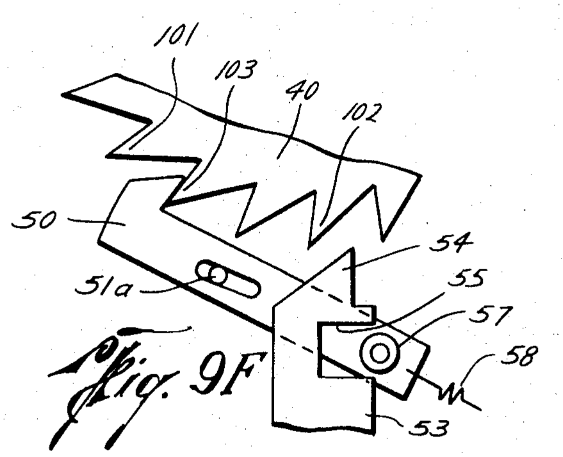

In FIG. 9*e*, the encoding key is released and bar 53 is disengaged from the indexing wheel by means of spring 59, thereby allowing the indexing wheel to rotate clockwise as indicated by the arrow. Tooth 103 of the indexing wheel engages pawl bar 50 as shown in FIG. 9*f* and moves the bar upwardly until pivot pin 51*a* again limits the upward movement of the bar as shown in FIG. 9*a*. Thus, the escapement mechanism again assumes a static position with the indexing wheel having rotated a distance defined by spacing between the teeth of the indexing wheel. Accordingly, the spring motor has been allowed to drive the capstan wheel a predetermined distance and thus index the tape after a recording of digitally encoded data thereon.

While the invention has been described with reference to specific embodiments, the description is for illustration and is not to be construed as limiting the scope of the invention. Various modifications and changes may occur to those skilled in the art without departing from the spirit and scope of the invention as defined by the appended claims.

What is claimed is:

1. An escapement mechanism associated with coupling means for a source of mechanical power and a load comprising
(a) an indexing wheel operably connected in said coupling means,
(b) a pivotally and slideably supported pawl member for engaging said indexing wheel and thereby preventing the transfer of power to said load,
(c) a moveable mechanical member having a pawl portion for engaging said indexing wheel, said mechanical member being operably coupled with said pawl member so that movement of said mechanical member into engagement with said indexing wheel pivotally moves said pawl member until said pawl member disengages said indexing wheel, and
(d) means operable upon the disengagement of said pawl member from said indexing wheel for sliding said pawl member to a position for re-engagement with said indexing wheel upon the disengagement of said mechanical member and said indexing wheel.

2. In a portable magnetic recorder including an encoding keyboard, a magnetic recording medium, a recording head, a source of mechanical power, means for driving the recording medium past the recording head, and coupling means coupling the source of power to the drive means, an escapement mechanism for allowing said drive means to advance said magnetic recording medium past said recording head in discrete increments comprising
(a) an indexing wheel operably connected in said coupling means,
(b) a pawl member for engaging said indexing wheel and thereby preventing the advancement of said recording medium, and
(c) a mechanical member operably coupled with said pawl member and said keyboard, said mechanical member engaging said indexing wheel and disengaging said pawl member from said indexing wheel when said keyboard is actuated, said mechanical member disengaging said indexing wheel and re-engaging said pawl member with said indexing wheel upon deactuation of said keyboard.

3. An escapement mechanism as defined by claim 2 wherein said pawl member is pivotally and slideably supported, said mechanical member pivoting said pawl member until said pawl member disengages said indexing wheel whereupon said pawl member slides to a position for re-engagement with said indexing means upon deactuation of said keyboard.

4. In a portable magnetic recorder having an encoding keyboard, recording medium and a magnetic recording means, a drive mechanism comprising:
(a) a source of mechanical power,
(b) drive means for moving said record medium past said recording means,
(c) coupling means for coupling said source of mechanical power to said drive means, said coupling means including an indexing means,
(d) pawl means for engaging said indexing means and thereby preventing operation of said coupling means, and
(e) a bar member operably coupled with said pawl means and said keyboard, said bar member being movable linearly into and out of engagement with said indexing means, said bar member engaging said indexing means and disengaging said pawl means from said indexing when at least one key of said keyboard is depressed, said bar member disengaging said indexing means and re-engaging said pawl means with said indexing means upon release of said key of said keyboard.

5. A drive mechanism as defined by claim 4 wherein said bar member includes a pawl portion which engages said indexing means when a key of said keyboard is depressed.

6. A drive mechanism as defined in claim 4 further comprising means operable upon the disengagement of said pawl means from said indexing means for sliding said pawl means to a position for re-engagement with said indexing means upon disengagement of said bar member and said indexing means.

7. A drive mechanism as defined by claim 4 wherein said source of mechanical power includes a spring motor which develops substantially constant force.

8. A drive mechanism as degned by claim 4 wherein said pawl means includes a slot which engages a pin of a stationary support means, said pawl means being pivotable about said pin, linear movement of said bar member pivoting said pawl means about said pin until said pawl means disengages said indexing means whereupon said pawl member slides to position for re-engaging said indexing means.

9. A drive mechanism as defined by claim 4 wherein said bar member includes a pawl portion which engages said indexing means when a key of said keyboard is depressed, and said pawl member includes a slot which engages a pin of a stationary suport means, said pawl means being pivotable about said pin, liner movement of said bar member pivoting said pawl means about said pin until said pawl means disengages said indexing means whereupon said pawl member slides to a position for re-engaging said indexing means upon the disengagement of said pawl portion of said bar member.

References Cited

UNITED STATES PATENTS

| | | | |
|---|---|---|---|
| 2,732,504 | 1/1956 | Steele | 242—55.12 |
| 3,239,119 | 3/1966 | Anderson | 226—157X |
| 3,289,189 | 11/1966 | Clark et al. | 226—157X |
| 3,448,249 | 6/1969 | Jones | 226—157X |

BERNARD KONICK, Primary Examiner

GARY M. HOFFMAN, Assistant Examiner

U.S. Cl. X.R.

226—157; 346—14; 188—82.7; 178—42